United States Patent
Fromm et al.

(10) Patent No.: US 9,592,638 B2
(45) Date of Patent: Mar. 14, 2017

(54) TOP DRIVE MOBILE CART FOR THREE DIMENSIONAL OBJECT PRINTING SYSTEMS

(71) Applicant: Xerox Corporation, Norwalk, CT (US)

(72) Inventors: Paul M. Fromm, Rochester, NY (US); Erwin Ruiz, Rochester, NY (US); Steven M. Russel, Bloomfield, NY (US); Jeffrey J. Bradway, Rochester, NY (US); Jorge M. Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

(21) Appl. No.: 14/716,022

(22) Filed: May 19, 2015

(65) Prior Publication Data

US 2016/0339638 A1 Nov. 24, 2016

(51) Int. Cl.
*B29C 67/00* (2006.01)
*B33Y 30/00* (2015.01)
*B33Y 40/00* (2015.01)
*B33Y 10/00* (2015.01)

(52) U.S. Cl.
CPC ...... *B29C 67/0085* (2013.01); *B29C 67/0051* (2013.01); *B29C 67/0055* (2013.01); *B29C 67/0059* (2013.01); *B29C 67/0092* (2013.01); *B29C 67/0096* (2013.01); *B33Y 10/00* (2014.12); *B33Y 30/00* (2014.12); *B33Y 40/00* (2014.12)

(58) Field of Classification Search
CPC ............ B29C 67/0051; B29C 67/0055; B29C 67/0059; B29C 67/0085; B29C 67/0092; B29C 67/0096; B33Y 10/00; B33Y 30/00; B33Y 40/00

USPC ... 425/225, 232, 375, 174.4; 134/49, 122 R; 104/279

See application file for complete search history.

(56) References Cited

U.S. PATENT DOCUMENTS

| | | | |
|---|---|---|---|
| 2,765,547 | A | 10/1956 | Dimmel et al. |
| 2,944,275 | A | 7/1960 | Markusen |
| 5,904,100 | A | 5/1999 | Findley et al. |
| 6,191,507 | B1 | 2/2001 | Peltier et al. |
| 6,688,021 | B2 | 2/2004 | Baig et al. |
| 7,070,250 | B2 | 7/2006 | Lester et al. |
| 8,167,395 | B2 | 5/2012 | Fienup et al. |
| 8,288,004 | B2 | 10/2012 | Moorlag et al. |
| 8,692,011 | B2 | 4/2014 | Moorlag et al. |
| 8,851,664 | B2 | 10/2014 | Spence |

(Continued)

FOREIGN PATENT DOCUMENTS

EP       2 474 418 B1      7/2012

*Primary Examiner* — Matthew Daniels
*Assistant Examiner* — Lawrence D Hohenbrink, Jr.
(74) *Attorney, Agent, or Firm* — Maginot Moore & Beck LLP (57) ABSTRACT

A mobile cart that moves through a three-dimensional object printing system includes a first member having a pair of surface that slide along a pair of tracks, a receiver mounted to the first member that moves the cart along the tracks, and a planar member that has a surface for forming a three-dimensional object, and that is connected to the first member. The planar member and the first member are configured to enable an ejector head positioned opposite the track to pass between the planar member and the first member as the cart moves along the track.

20 Claims, 4 Drawing Sheets

(56) References Cited

U.S. PATENT DOCUMENTS

| | | |
|---|---|---|
| 2011/0125307 A1 | 5/2011 | Dickson et al. |
| 2012/0157277 A1 | 6/2012 | Moorlag et al. |
| 2013/0293652 A1 | 11/2013 | Spence et al. |
| 2013/0293653 A1 | 11/2013 | Spence et al. |
| 2014/0125749 A1* | 5/2014 | Spence ................... B41J 2/215 |
| | | 347/104 |

* cited by examiner

TOP DRIVE MOBILE CART FOR THREE DIMENSIONAL OBJECT PRINTING SYSTEMS

TECHNICAL FIELD

This disclosure relates generally to three-dimensional object printing systems, and, in particular, to mobile carts used in three-dimensional object printing systems.

BACKGROUND

Digital three-dimensional object manufacturing, also known as digital additive object manufacturing, is a process of making a three-dimensional solid object of virtually any shape from a digital model. Three-dimensional object printing is an additive process in which one or more ejector heads eject successive layers of material on a substrate in different shapes. Typically, ejector heads, which are similar to printheads in document printers, include an array of ejectors. Ejectors within a single ejector head can be coupled to different sources of material or all of the ejectors in an ejector head can be coupled to the same source of material to enable all of the ejectors in an ejector head to eject drops of the same material. Materials that become part of the object being produced are called build materials, while materials that are used to provide structural support for object formation, but are later removed from the object are known as support materials. Three-dimensional object printing is distinguishable from traditional object-forming techniques, which mostly rely on the removal of material from a work piece by a subtractive process, such as cutting or drilling.

Figure 3:
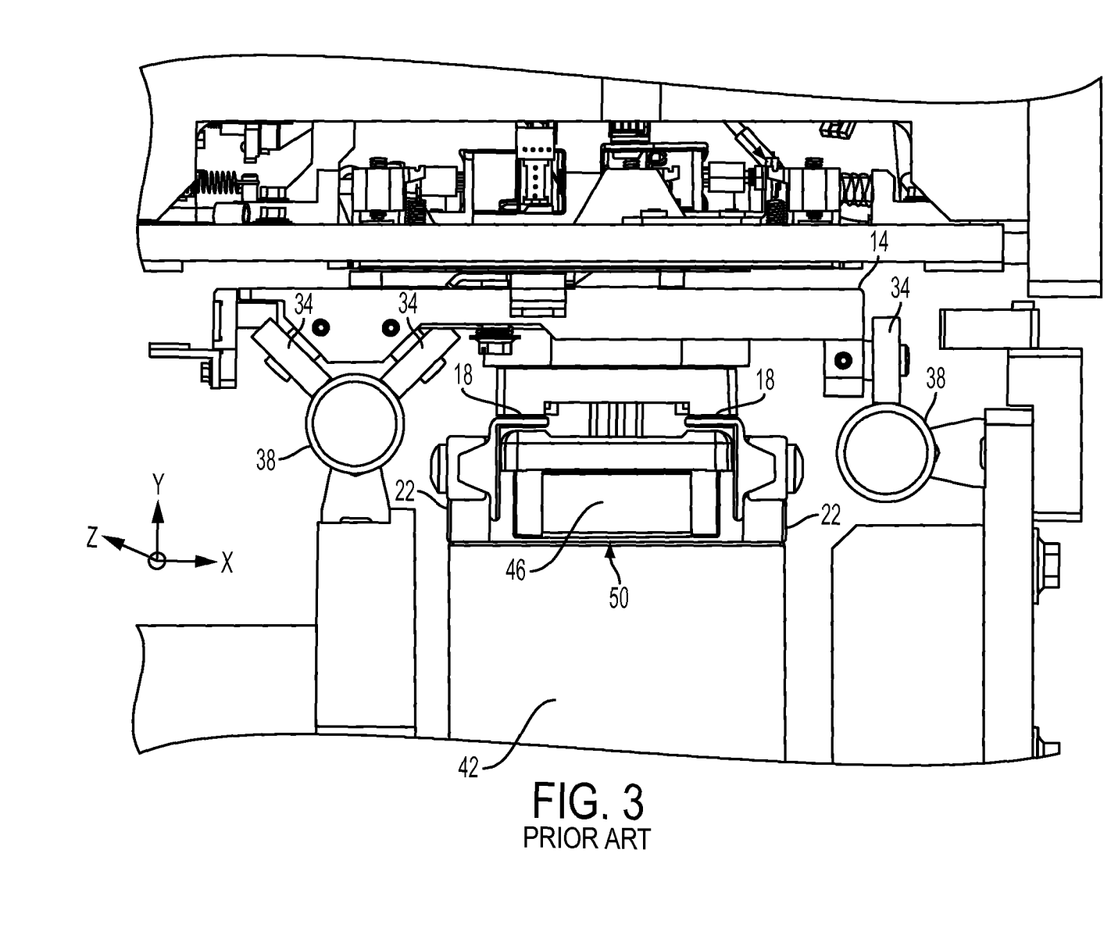
FIG. 3 is an end view of a known mobile cart in a three-dimensional printing system.
Figure 4:
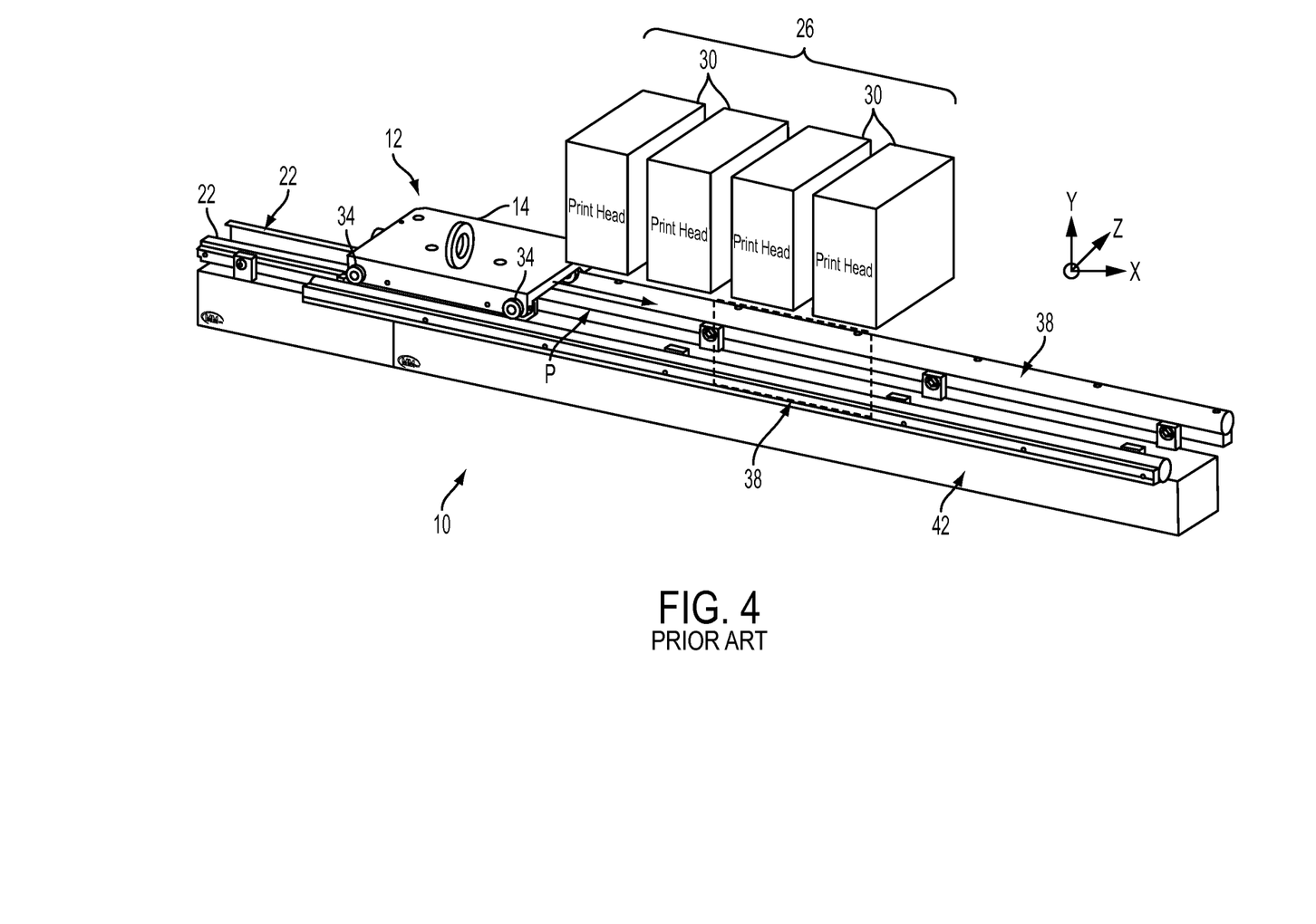
FIG. 4 is a perspective view of a known three-dimensional printing system.

A previously known three-dimensional object printing station 26 is shown in FIG. 4. In the view depicted in that figure, a cart 12 includes a platform 14, which is configured with bearings 34 and surfaces 18 (FIG. 3). The bearings 34 ride upon precision rails 38 as described below, while the surfaces 18 slide upon track rails 22 to enable the cart to move in a process direction P along the z axis between printing stations, such as the printing station 26 shown in FIG. 4. Printing station 26 includes four ejector heads 30, although fewer or more ejector heads can be used in a printing station. Once the cart 12 reaches the printing station 26, the cart 12 transitions from riding on the rails 22 to moving along precision rails 38 through the printing station. Precision rails 38 are cylindrical rail sections that are manufactured within tight tolerances to help ensure accurate placement and maneuvering of the cart 12 beneath the ejector heads 30. Linear electrical motors are provided within housing 42 (FIG. 3) to interact with a magnet inside housing 46, which is connected to the lower surface of the platform 14 of the cart 12. The motors generate electromagnetic fields that interact with the magnet to propel the cart along the track rails 22 between print stations and along the precision rails 38 within the printing stations. Once the cart 12 is beneath the printing station 26, ejection of material occurs in synchronization with the motion of the cart. Electrical motors (not shown) are operatively connected to a gantry to which the ejector heads are mounted to move the ejector heads in an X-Z plane that is parallel to an upper surface of the platform 14 as layers of material are formed in the object. Alternatively, full-row ejector heads can be used that do not to move in order to eject material in the X-Z plane. Additional motors (not shown) move the ejector heads 30 of the printing station 26 vertically with respect to the platform 14 as layers of material accumulate to form an object. Alternatively, a mechanism can be provided to move an upper surface of the cart 14 vertically and horizontally for formation of the object. Once the printing to be performed by a printing station is finished, the cart 14 is moved to another printing station for further part formation, layer curing, or other processing.

An end view of the cart 12 is shown in FIG. 3. That view depicts in more detail the surfaces 18 that rest upon the rails 22 that extend from and above the electrical motor housing 42. As the motors generate electromagnetic fields that interact with the magnet in housing 46, the surfaces 18 of the cart 12 slide along the track rails 22. At the printing station, the bearings 34 of the cart 12 contact the precision rails 38 in an arrangement that facilitates accurate positioning of the build platen on the platform 14. Specifically, bearings 34 are positioned at a right angle to one another on one of the rails 38 to remove four degrees of freedom of the cart 14, while the other bearing 34 rests on the other rail 38 to remove one more degree of freedom. Gravity and magnetic attraction between the electrical motor and the magnet in the housing 46 hold the bearings 34 in contact with the rails 38.

When carts are not present underneath the ejector heads 30, errant drips of materials can fall from the ejector heads and produce undesired debris and contamination on the precision rails 34 and the housing 42. Furthermore, contaminants can become hardened in the presence of ultraviolet radiation, which may be used during a curing process in the printing system 10. This can lead to a continual buildup of a layer of contaminating material. Other materials such as dust and other particulates and stray matter can also contaminate portions of the printing system that impact accuracy or efficiency of a printing operation.

In order to produce three-dimensional objects with acceptable quality, the motion of the cart 12 beneath the ejector heads 30 needs to be precise. If materials from the ejector heads collect where the bearings 34 interface with the precision rails, the linear velocity of the cart is disrupted and the quality of the printed object is affected. Additionally, the collection of material drops on top of the housing 42 may affect the dissipation of heat from the motors and impact the performance and reliability of the motors. Therefore, improvements in three-dimensional object printing systems that help eliminate the contamination on the precision rails and motor housing that affects the accuracy of the placement and movement of the cart would be beneficial.

SUMMARY

In order to accurately and efficiently print three-dimensional objects without contamination, a three-dimensional object printing system includes a pair of parallel tracks, an ejector head positioned opposite the tracks, and, a mobile cart that moves along the tracks through the printing system.

The mobile cart includes a first member, a receiver, and a planar member. The first member has a pair of surfaces configured to slide along a pair of parallel tracks of the printing system. The receiver is mounted to the first member, and is configured to move the mobile cart along the pair of parallel tracks in response to a driving force. The planar member has a surface for receiving material ejected from an ejector head of the printing system positioned opposite the pair of parallel tracks, and is connected to the first member so as to position the ejector head between the first member and the planar member when the planar member is opposite the ejector head.

In another embodiment, a mobile cart includes a U-shaped member that has a planar platform and a pair of load-bearing members. The planar platform is in a first plane, and the pair of load-bearing members are in a second plane that is parallel to the first plane. The load-bearing members are configured to move the mobile cart along the pair of parallel rails of the printing system. The U-shaped member is configured to enable the ejector head to pass between the first plane and the second plane as the mobile cart passes the ejector head.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

In the printing system 10 described above and illustrated in FIG. 4, the housing 42, rails 38, and tracks 22 are at risk of collecting contaminants at least partially because the housing 42, rails 38, and tracks 22 are positioned within a contamination zone of the ejector head 30.

In contrast, this disclosure proposes a printing system and mobile cart positioned and arranged such that surfaces affecting the location of the mobile cart and the performance of the printing system are positioned outside of a zone that can receive debris produced by the ejector head. This configuration decreases the maintenance requirements of the printing system and can have other benefits as described in further detail below.

Figure 1:
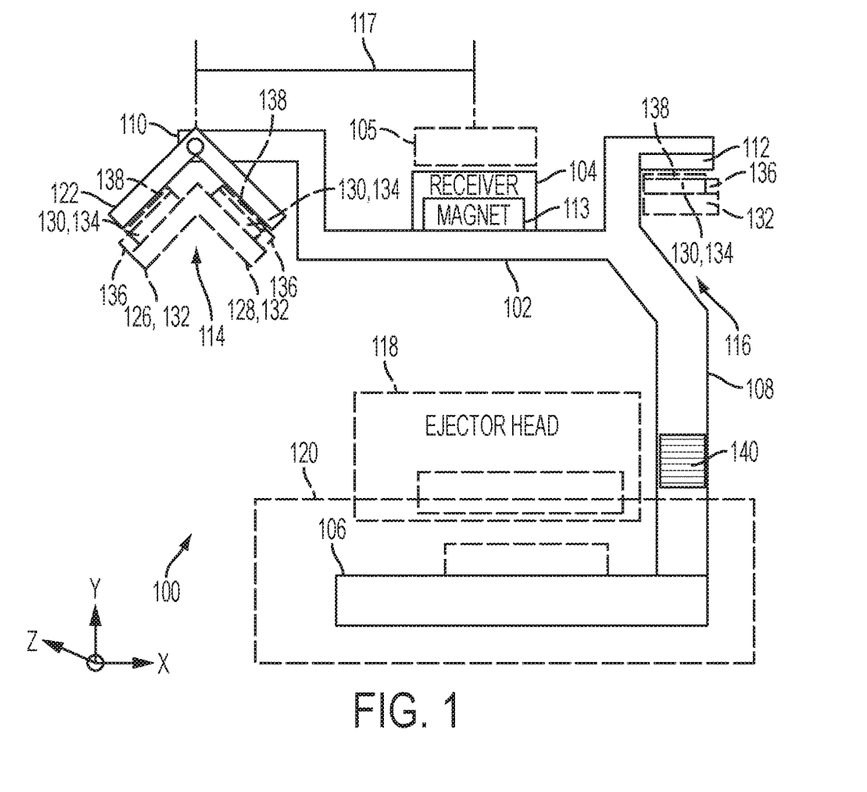
FIGS. 1 and 2 are end views of different exemplary embodiments of a mobile cart that moves through a three-dimensional printing system according to this disclosure.

FIG. 1 depicts a front view of an exemplary embodiment of a suspended mobile cart 100 for a three-dimensional object printing system according to this disclosure. The mobile cart 100 includes a U-shaped support member 102, a receiver 104, an object support member 106, and a connecting member 108. The U-shaped member 102 is configured with flanges 110 and 112 to enable air bearings 130 to be positioned for sliding along parallel rails 114, 116 in the printing system. The connecting member 108 is offset from the center of the U-shaped support member 102 to connect object support member 106 to the support member 102 and orient the object support member 106 in a horizontally level position to enable ejector head 118 to eject material towards the object support member 106. Receiver 104 is mounted to the first member 102, and is configured to respond to a driving force and move the mobile cart along the pair of parallel tracks 114 and 116. In the embodiment illustrated in FIG. 1, the receiver 104 includes a magnet 113, such as the magnet described above with regard to FIG. 3, which responds to linear accelerator motors in a housing 105 positioned opposite the receiver 104. Other embodiments include other acceptable types of mechanisms configured to engage a driving force, such as a moving belt or gear drive, which moves the mobile cart 100 along the housing 105.

The receiver 104 is positioned at most a first distance 117 in a cross-process direction along the x-axis from the flange 110 that supports the mobile cart 100 on the track 114. In linear rail and linear bearing systems, suboptimal configuration of a drive mechanism relative to bearing and sliding surfaces can result in a phenomenon commonly referred to as binding or chattering, or a stick-slip condition, which can include irregular, imprecise, or impeded movement through a bearing system. When the element that receives a driving force, i.e. the receiver 104 in FIG. 1, is offset from the surfaces supported by the bearing tracks, application of the driving force results in a moment force that causes the sliding and bearing surfaces to interfere with one another. The larger the offset, the larger the interference. At a certain magnitude, the moment force impedes motion along the bearing tracks. This relationship can be described by:

$$D < \frac{L}{2 \times \mu}$$

where D is a distance of the offset between the drive mechanism and the rail that prevents binding and chatting, L is the length of the moving surface along the rail, and $\mu$ is the coefficient of friction between the bearing and the sliding surfaces. In two rail systems, where one rail is a "fixed" rail that limits four degrees of freedom, and the other is a "floating" rail that limits a fifth degree of freedom to enable movement along the rails in the sixth degree of freedom, the distance D is the offset distance between the receiver and the fixed rail. Since the slip-stick issue can also come about when friction changes between static and kinetic, the coefficient of friction used in the above equation is generally the higher coefficient of static friction $\mu_s$. Limiting the offset distance D between the driving force and the fixed rail advantageously enables smooth movement along the rails. The area of the object support member 106 does not interfere with the placement of the receiver 104 so the receiver is at most the first distance 117 away from the flange 110 on the support member 102 in the cross-process direction.

The cart configuration illustrated in FIG. 1 enables the ejector head 118 to pass between the support member 102 and the planar object support member 106. Consequently, the ejector head 118 cannot eject material onto surfaces that impact the movement of the mobile cart 100. In an alternative embodiment, a tray or other receptacle is positioned so the planar object support member 106 passes between the receptacle and the ejector head. Thus, the receptacle can collect errant particles or portions of material ejected by the ejector head that do not reach the planar object support member 106 of the mobile cart 100. Such a collection surface can be easily cleaned without interfering with the operation of the printing system. In such an embodiment, the receptacle can be cleaned with a wiper or other cleaning device while the printing system operates the ejector head 118 and moves the mobile cart 100 so the operation of the printing system is not interrupted.

In the embodiment illustrated in FIG. 1, an L-shaped bracket 122 is mounted to the flange 110 of the support member 102. This configuration restrains a movement of the mobile cart 100 in four directions, i.e., an x and y direction, as well as rotation about the x and y directions. The flange 112 restrains the movement of the mobile cart 100 from rotating about a z direction. As illustrated in FIG. 1, the track 114 includes a first member 126 and a second member 128 that are oriented at right angles to one another. In other embodiments, the track 114 can have other acceptable shapes, including a round, or chamfered shape as well as other regular and irregular shapes, and the flange 110 can be shaped to complement the shapes of the track 114.

In the embodiment of FIG. 1, the orthogonally oriented arms 132 of the parallel tracks 114 and 116 support planar air bearings 130. The flanges 110 and 112 of support member 102 are configured to slide along the planar air bearings 130 in the process direction along the z-axis. In other embodiments, the parallel tracks 114 and 116 include other types of acceptable bearings, including linear, fluid, and magnetic bearings. In one embodiment, the parallel tracks 114 and 116 have smooth surfaces, and the pair of flanges 110 and 112 on the mobile cart 100 further includes bearings or sliding surfaces configured to move along the smooth surfaces of the tracks 114 and 116.

Each of the planar air bearings 130 includes a porous member 134, such as, for example, a porous carbon member, and an air source 136. The air source 136 is configured to blow air into the porous member 134, which has a plurality of pores that are configured to receive the air and allow the air to leak out of the porous member 134 to form pressure regions 138. Gravity biases the mobile cart 100 against the pressure regions 138, which are configured to support the flanges 110 and 112 and exhibit extremely low coefficients of friction that enable the mobile cart 100 to move smoothly along the pair of parallel tracks 114 and 116. In one embodiment, the porous members 134 include a plurality of porous element sections that are butted together and mounted onto the support member 132 along the process direction. In an embodiment, after being assembled together to form the porous member 134, the porous element sections are ground via a grinding process in order to remove any perturbation or irregularities in surfaces of the porous element sections or junctions between adjacent porous element sections.

In one embodiment, the air source 136 is configured to extract the air for producing the pressure region 138 from air surrounding the tracks 114 and 116, such as by producing a vacuum that draws air into the air source 136 and a positive pressure that expels the air into the porous member 134. In another embodiment, the air source 136 is in communication with an air pressure unit (not illustrated) that is configured to provide the air source 136 with pressurized air to be fed into the porous member 134.

While the embodiment of FIG. 1 includes an air source 136, other fluid sources that enable the flanges to move along the tracks are contemplated. In an embodiment, a fluid reservoir is configured to provide a source 136 with a fluid that (1) does not react with material ejected by the ejector head 118, (2) does not corrode or rust materials of the mobile cart 100, the tracks 114, 116, or other materials of the printing system, (3) enables the pressure region 138 to exhibit a desired coefficient of friction, and (4) has desirable anti-sparking, thermal properties, or the like. In one embodiment, the fluid is a liquid lubricant.

As described above, the air sources 136 are positioned to be outside of the contamination zone so that the tracks 114 and 116 have a reduced risk of contamination from material ejected by the ejector head 118. However, other materials can also present a risk of contamination. For example, dust particles, or other stray matter from the mobile cart 100, printing system, or other sources can collect on the tracks 114 and 116 and present a risk of interfering with the planar air bearings 130 or the motion of the mobile cart 100. Therefore, reducing a risk of contaminants collecting on the tracks 114 and 116 can be beneficial.

In one embodiment, the air sources 136 are configured to introduce air into the porous members 134 that, in addition to producing the pressure region 138, acts to blow contaminants away from the tracks 114 and 116 when leaking out from the porous member 134. In an embodiment, the air source 136 is adjustable to produce pressure regions 138 having adjustable properties. For example, in one embodiment, the air source is configured to increase the airflow into the porous members 134 during a maintenance operation in order to clear contaminants from the tracks 114 and 116. In another embodiment, the air source 136 is configured to provide different amounts of air to the porous member 134 in order to adjust characteristics of the pressure region 138. For example, the pressure region 138 can be adjusted in order to compensate for varying weights of the mobile cart 100 or an object being printed on the mobile cart 100, for varying speeds of the mobile cart 100 moving along the tracks 114, and 116, and for other reasons.

In this embodiment, the mobile cart 100 slides along the planar air bearings 130, and does not include any elements that rotate or roll along the tracks 114, 116, such as wheels or ball-bearings. In systems with rolling and rotating elements, angular momentum resulting from such rolling or rotation can induce vibrations that can disrupt, for example, the location of the planar object support member 106 in relation to the ejector head 118. These vibrations can lead to a decrease in accuracy of material deposited by the ejector head. By moving through the printing system exclusively via sliding, such as via the flanges 110 and 112 sliding over the planar air bearings 130, the mobile cart 100 is configured to enable smooth motion through the printing system.

Additionally, in embodiments where the mobile cart 100 slides along the porous air bearings 130, the mobile cart 100 is separated from the surface of the porous air bearings 130 by the pressure region 138, and thus does not come into physical contact with the tracks 114 and 116 while moving through the printing system. This configuration decreases the risk of discontinuities, irregularities, or contaminants on the tracks 114 and 116 affecting efficiency or accuracy of forming a three-dimensional object on the mobile cart 100.

The cart support member 102 supports the planar object support member 106, upon which the three-dimensional object can be formed, via the connecting member 108. The connecting member 108 extends at least partially in a direction that is normal to the plane of the planar object support member 106. In other embodiments, a plurality of connecting members connects the support member 102 with the planar object support member 106. In the embodiment illustrated in FIG. 1, the connecting member 108 is connected to a first side of the planar object support member 106 so supports (not illustrated) for printing station components, such as the ejector head 118, can be configured to support a second side of the planar object support member 106 and do not interfere with the connecting member 108 as the mobile cart 100 moves through the printing system. In another embodiment, the connecting member 108 is connected to a central portion of the planar object support member 106 so supports for printing stations are configured to pass along the sides of the planar object support member 106.

In the embodiment illustrated in FIG. 1, the connecting member 108 can be configured with an actuator 140 that is operable to move the planar object support member 106 relative to the support member 102 in order to change a distance between the planar object support member 106 and the ejector head 118. In some printing systems, the ejector head 118 includes a height adjustment actuator that is configured to adjust a location of the ejector head 118 on the y axis, i.e., the direction normal to the plane of the planar object support member. However, enabling the mobile cart 100 to adjust a location of the planar object support member 106 can be beneficial. For example, the actuator 140 can be configured to calibrate the ejector head 118, enable the ejector head 118 to print objects having different widths in the y-axis, compensate for a varying weight of material on the planar object support member 106, or operate in concert with a height actuator of the ejector head 118 to enable coarse and fine control of the y-axis location of the planar object support member 106.

In an embodiment, the planar object support member 106 is configured to be selectively removed from the connecting member 108, and is one of a plurality of interchangeable planar object support members. For example, different planar object support members can have different sizes or shapes for supporting different objects to be printed by the printing system. In an embodiment, the mobile cart 100 is configured to release a planar object support member 106, for example, upon completion of a printing operation for forming a three-dimensional object on the object support member, and is further configured to receive another planar member 106 after the object formation in order to continue operation of the printing system.

In one embodiment, the printing system includes different mobile carts 100 having planar object support members 106 of different sizes and configurations. In the mobile cart 100 illustrated in FIG. 1, the planar object support member 106 has an area that is greater than the area of the support member 102. Because the planar object support member 106 is spaced apart from the support member 102, the planar object support member 106 can have a larger area for forming a three-dimensional object without interfering with positions of the tracks 114 and 116 and other components of the printing system.

Figure 2:
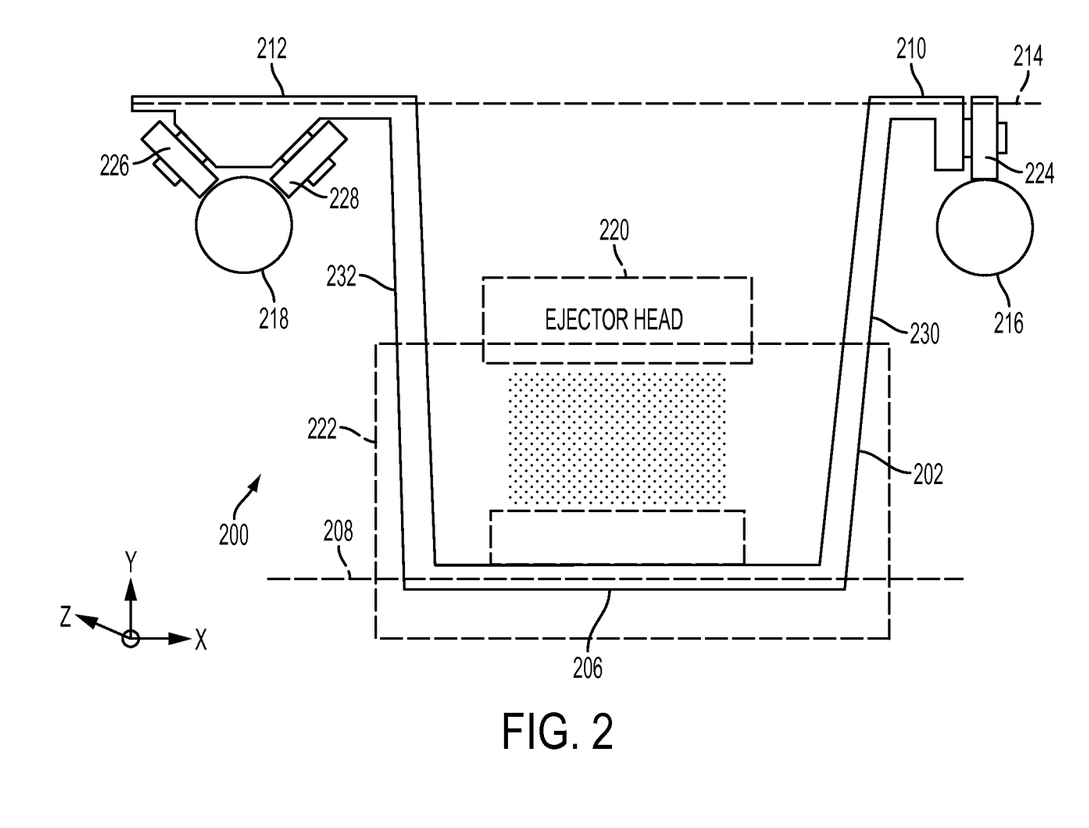

FIG. 2 illustrates another embodiment of a mobile cart 200 according to this disclosure. The mobile cart 200 includes a U-shaped support member 202. The U-shaped support member is defined by a planar object support platform 206 in a first plane 208 and a pair of load-bearing flanges 210, 212 that are in a second plane 214 that is parallel to the first plane 208. The U-shaped support member is configured to move the mobile cart 200 along a pair of parallel rails 216, 218 of a printing system. The U-shaped support member 202 enables an ejector head 220 of the printing system to pass between the object support member 206 and the flanges 210, 212 as the cart 200 moves through the printing system. This configuration keeps the parallel rails 216, 218, the flanges 210, 212, and other surfaces that can affect motion of the cart out of a contamination zone 222 of the ejector head 220.

In the embodiment of FIG. 2, the first load bearing flange 210 includes a wheel 224 that is mounted to the member 202 for rotation so the wheel rolls along the rail 216, and the second load bearing flange 212 includes a pair of wheels 226, 228 that are mounted to the member 202 and oriented at a right angle relative to each other. These wheels roll along the rail 218. The pair of wheels 226, 228 constrain the mobile cart 200 in four directions, and the wheel 224 constrains the mobile cart 200 in a fifth direction, to enable the mobile cart 200 to move along the rails 216, 218 in a sixth direction, i.e., the process direction. Integral with member 202 or separately connected between the flanges 210, 212 and the object support member 206 are connecting members 230, 232. These connecting members 230, 232 extend in a direction normal to the first plane 208 to enable the ejector head 220 to pass through a space between the first plane 208 and the second plane 214.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A mobile cart that moves through a three-dimensional object printing system, the mobile cart comprising:
    a first member having a pair of surfaces configured to slide along a pair of parallel tracks;
    a receiver mounted to the first member, the receiver being configured to move the mobile cart along the pair of parallel tracks in response to a driving force; and
    a planar member having a surface for receiving material ejected from an ejector head of the three-dimensional object printing system, the planar member being connected to the first member to position the ejector head between the first member and the planar member when the planar member and first member are on opposite sides of the ejector head.

2. The mobile cart according to claim 1, wherein the surface of the planar member has an area that is greater than an area of the pair of surfaces of the first member.

3. The mobile cart according to claim 1, wherein the first member is connected to the planar member by at least one second member extending between the first member and the planar member at least partially in a direction normal to the surface of the planar member.

4. The mobile cart according to claim 3, the at least one second member further comprising:
    an actuator that is configured to move the planar member relative to the first member to change the distance between the planar member and the ejector head.

5. The mobile cart according to claim 1, wherein the receiver is positioned at most a first distance away from one of the pair of surfaces on the first member in a cross-process direction that enables the mobile cart to move along the tracks without binding.

6. The mobile cart according to claim 1, wherein the pair of surfaces on the first member are configured to move along porous planar air bearings of the pair of parallel tracks.

7. The mobile cart according to claim 1, the receiver further comprising:
    a magnet.

8. A three-dimensional object printing system comprising:
    an ejector head that is configured to eject material to form an object;
    a pair of parallel tracks having a track portion which passes on opposite sides of the ejector head; and
    a mobile cart, the mobile cart comprising:
    a first member having a pair of surfaces configured to slide along the pair of parallel tracks;
    a receiver mounted to the first member, the receiver being configured to move the mobile cart along the pair of parallel tracks in response to a driving force; and
    a planar member having a surface for receiving material ejected from the ejector head, the planar member being connected to the first member to position the ejector head between the first member and the planar member when the planar member is opposite the ejector head.

9. The printing system according to claim 8, wherein the planar member is one of a plurality of interchangeable planar members configured to be selectively connected to the mobile cart.

10. The printing system according to claim 8, wherein each track in the pair of parallel tracks includes a porous planar air bearing that is configured to produce a pressure region for supporting the mobile cart.

11. The printing system according to claim 10, the pair of surfaces on the first member of the mobile being configured to support the mobile cart on the pressure region of the porous planar air bearing.

12. The printing system according to claim 10, the porous planar air bearing further comprising:
an air source configured to blow air into the at least one porous planar air bearing; and
a plurality of pores that enable the air to pass through the at least one porous planar air bearing to form the pressure region.

13. The printing system according to claim 12, the air source being further configured to blow an amount of air into at least one porous planar air bearing to enable contaminants to be removed from the at least one porous planar air bearing by the air emitted from the pores.

14. The printing system according to claim 12, wherein the receiver is positioned at most a first distance away from one of the pair of surfaces on the first member in a cross-process direction that enables the mobile cart to move along the tracks without binding.

15. The printing system according to claim 9, wherein the first member of the mobile cart is connected to the planar member by at least one second member extending between the first member and the planar member at least partially in a direction normal to the surface of the planar member.

16. A mobile cart that moves through a three-dimensional object printing system, the mobile cart comprising:
a U-shaped member that includes:
a planar platform in a first plane; and
a pair of load-bearing members that are in a second plane that is parallel to the first plane, the pair of load-bearing members being configured to move the mobile cart along a pair of parallel rails of the printing system;
the U-shaped member being configured to enable an ejector head to pass between the plane of the load-bearing members and the plane of the planar platform as the mobile cart passes the ejector head.

17. The mobile cart according to claim 16, a first of the pair of load-bearing members including a wheel configured to roll along one rail of the pair of parallel rails; and
a second of the pair of load-bearing members including a pair of wheels that are at a right angle relative to each other and that are configured to roll along another of the pair of parallel rails.

18. The mobile cart according to claim 16 further comprising:
a receiver mounted to one of the pair of load-bearing members, the receiver being configured to move the mobile cart along the pair of parallel tracks in response to a driving force.

19. The mobile cart according to claim 18, the receiver further comprising:
a magnet.

20. The mobile cart according to claim 16, the mobile cart further comprising:
a third member that connects the planar platform to a first of the pair of load-bearing members; and
a fourth member that connects the planar platform to a second of the pair of load-bearing members,
wherein the third and fourth members extend at least partially in a direction normal to the plane of the planar platform.

\* \* \* \* \*